(No Model.)

W. J. THOMAS.
FRUIT GATHERER.

No. 588,197. Patented Aug. 17, 1897.

Witnesses:
L. C. Hills
J. M. Pfiffer

Inventor:
W. J. Thomas,
by Franklin H. Hough
Atty.

UNITED STATES PATENT OFFICE.

WILL J. THOMAS, OF GLOVERSVILLE, NEW YORK.

FRUIT-GATHERER.

SPECIFICATION forming part of Letters Patent No. 588,197, dated August 17, 1897.

Application filed December 4, 1896. Serial No. 614,501. (No model.)

*To all whom it may concern:*

Be it known that I, WILL J. THOMAS, a citizen of the United States, residing at Gloversville, in the county of Fulton and State of New York, have invented certain new and useful Improvements in Fruit-Gatherers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in fruit-gatherers, and especially to a framework which is adapted to be secured to the end of a pole, by means of which the fruit may be gathered by finger-like projections of the framework, whereby the fruit may be picked from the stem and allowed to drop into a webbing which is formed into a tubing which is adapted to convey the fruit to a basket or other receptacle.

More specifically the invention consists of forming out of a single piece of rigid wire a ring which is adapted to support the webbing, which is formed into a tube-like extension, portions of the said wire being formed into upwardly and backwardly curved extensions with a slight space intervening between same, whereby the said arms may grasp the fruit on either side of its stem and detach the same from the twig, and then the further provision of braces, which are downwardly extended and wound about a pole, to which the gatherer is designed to be held. In connection with the circular hook or ring, to which the webbing is attached, a part of my invention consists in supporting the outer rim of the said ring on a shoulder formed by bending a portion of the wire, as illustrated, which is upwardly and forwardly extended to engage with the fruit.

To these ends and to such others as the invention may pertain the same consists, further, in the novel construction, combination, and adaptation of parts, as will be hereinafter more fully described, and then specifically defined in the appended claim.

I clearly illustrate my invention in the accompanying drawings, which, with the letters of reference marked thereon, form a part of this specification, and in which—

Figure 1:
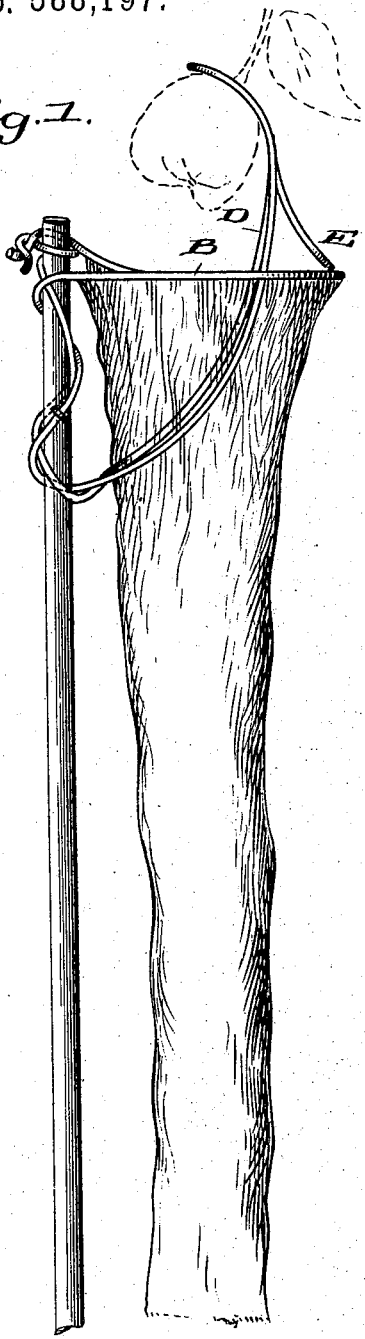
Figure 2:
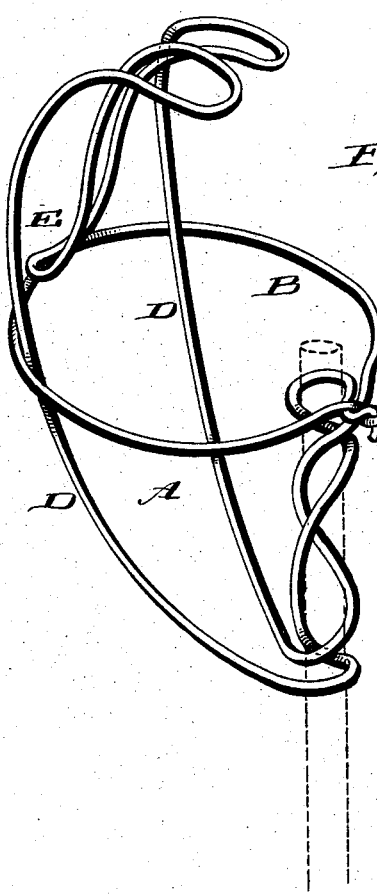

Figure 1 designates a perspective view of a fruit-gatherer embodying my invention. Fig. 2 is an enlarged detail of the wire framework supporting the webbing, the said framework being shown as constructed of a single piece of wire.

Reference now being had to the details of the drawings by letter, A designates a piece of wire which is formed into a hoop or band B, one end of the said wire being wound about the pole in a spiral manner, forming a socket in which the pole is held. The said strand is then continued, forming the upwardly-curved portion D, which extends up through the band, is forwardly curved, and then bent upon itself and downwardly extended to a location directly underneath the said band. The wire is then bent upon itself and a shouldered portion E formed, on which the outer rim of the band supporting the webbing is adapted to rest. The said strand is then continued upward and bent upon itself, forming a second arm, with a V-shaped space intervening between the two arms. The said strand is then continued downward, forming a second brace, and after being wound about the pole has its end secured to the other end of the said band.

From the foregoing it will be seen that in operation the curved arms, having a space intervening between the same, are reached over the fruit to be picked, one arm on either side of the stem of the fruit, and the same is detached from the twig, and the said curved arms will cause the fruit to fall into the upper end of the webbing, from which it will fall by gravity gradually down through the webbing into a basket or other receptacle without being in any way bruised. Owing to the peculiar way of supporting the outer rim of the band on the shoulder, as described, it will be observed that the end of the picker may be easily forced up through and against the branch or twig without any danger of the rim being bent out of a horizontal plane.

Having thus described my invention, what I claim to be new, and desire to secure by Letters Patent, is—

A fruit-gatherer made of a single piece of wire which is bent to form a hook or band adapted to support a webbing, the said wire thence being coiled to form a socket to receive a pole, thence upwardly and ovally curved, bent upon itself forming an arm, thence bent upon itself forwardly forming a shoulder on which the outer rim of the said band is supported, the wire thence continued upwardly and forwardly into a second curved arm thence downwardly extended and coiled about the socket portion and having its end secured to the end of the said band, substantially as shown and described.

In testimony whereof I affix my signature in presence of two witnesses.

WILL J. THOMAS.

Witnesses:
ASA B. PEAKE,
E. L. HUNTER.